INVENTOR.
AUGUST F. MANZ
BY Barnwell R. King
ATTORNEY

United States Patent Office 3,125,671
Patented Mar. 17, 1964

3,125,671
ARC WELDING SYSTEMS
August F. Manz, Newark, N.J., assignor to Union Carbide Corporation, a corporation of New York
Filed May 3, 1962, Ser. No. 192,209
6 Claims. (Cl. 219—131)

This invention relates to electric arc welding, and more particularly to work-in-circuit arc welding with a consumable wire electrode.

In consumable electrode electric arc welding there is a wide range of adjustments in wire feed rates and power supply outputs which jointly produce an acceptable welding condition for any given material and electrode diameter. For this reason in the past it has not been considered possible to correlate automatically the wire feed rate and power source output. With welding power supplies having only one volt-ampere slope characteristic, the welding condition for a given electrode material and diameter will depend upon the electrode feed rate and the open circuit voltage setting on the power supply. The most commonly used power supplies for consumable electrode electric arc welding include a variable slope reactor which permits the selection of any one of a number of volt-ampere characteristics. With such power supplies, the welding condition depends not only on the electrode feed rate and the power supply open circuit voltage setting, but also on the volt-ampere characteristic selected. Therefore, in order for a welding operator to establish the desired welding condition, he must correlate by manual adjustment in some cases two, in some cases three, variables. These variables are interdependent and the method used to arrive at the desired welding condition is usually empirical. The operator must rely upon his skill and experience to establish the welding condition rapidly through a trial and error procedure.

In consumable electrode welding using short circuiting type metal transfer, the same considerations in selecting the desired welding condition apply. However, with this mode of transfer, a relatively much narrower range of satisfactory welding conditions exists for any given combination of materials and equipment. It would be desirable, therefore, to have a system to automatically produce satisfactory welding conditions over the entire useable welding range for short circuiting type metal transfer by providing the proper wire feed speed and power supply setting by means of a single adjustment.

Such a single adjustment system would have many advantages over conventional welding control systems. It would remove the guesswork in producing satisfactory welding conditions over the entire recommended range for short circuiting type metal transfer welding. In addition, it would reduce initial setup time and permit less experienced operators to utilize the process. Finally, since it would be possible to operate only within the useful range of welding conditions, the danger of burnbacks would be virtually eliminated.

It is therefore, the primary object of this invention to provide a welding system which produces satisfactory welding conditions over the entire useful range for short circuiting type metal transfer welding by means of a single adjustment control which automatically correlates electrode feed rate with the proper power supply output. Other objects will be obvious to those skilled in the art from the present disclosure.

According to the invention the wire feed speed is mechanically linked to the voltage adjustment control of the welding power supply through a suitable gear reduction system to provide a single common adjustment control for consumable electrode welding.

Figure 1A:
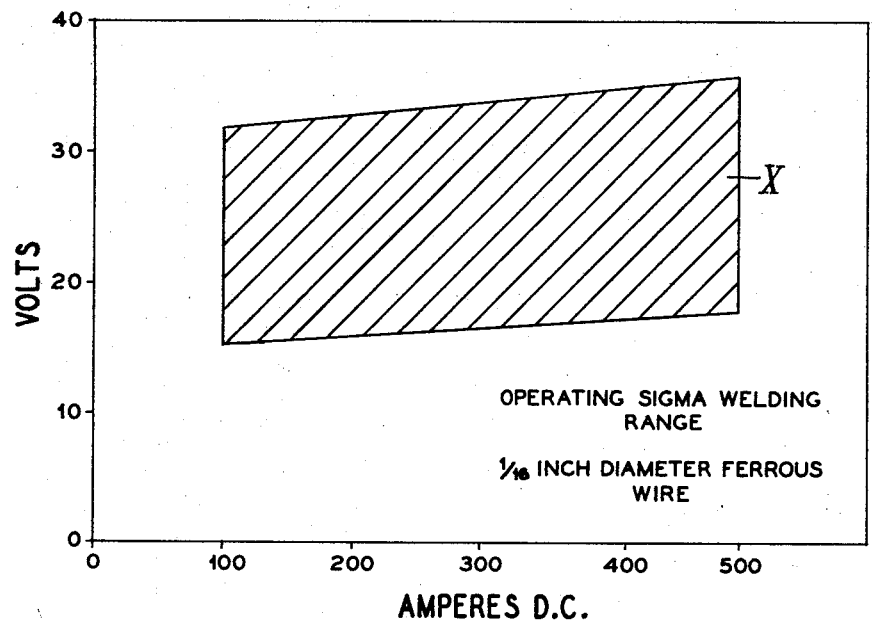
FIG. 1a is a graph showing the normal operating ranges of current and voltage for sigma (shielded-inert-gas-metal-arc) welding.
Figure 1B:
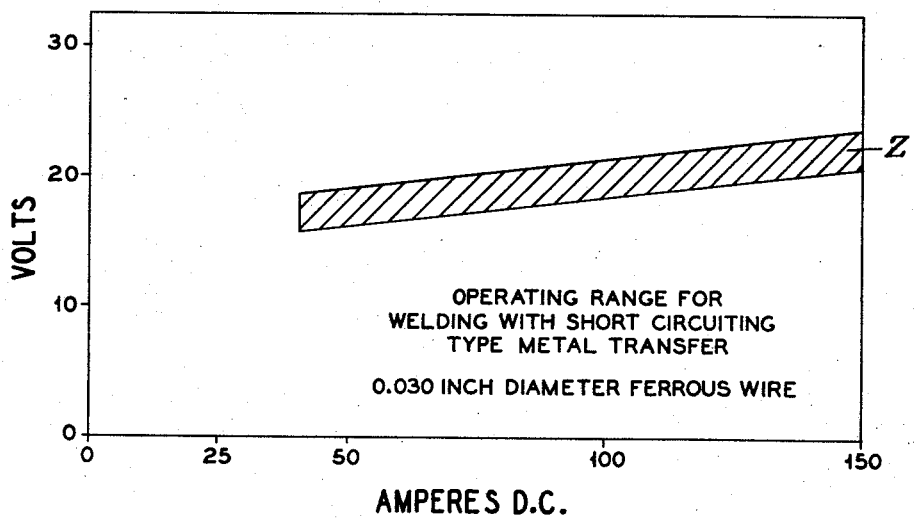
FIG. 1b is a graph showing the normal operating ranges of voltage and current for consumable electrode welding using short circuiting type metal transfer with 0.030 in. diameter steel wire.

As shown in FIG. 1a, there is virtually an infinite number of combinations of current and voltage which will produce useable welding conditions in the V–A characteristic area X for consumable electrode welding with spray type metal transfer. Such wide range of available adjustments has made it impracticable in the past to automatically correlate the wire feed rate and the power source output so as to produce suitable welding conditions over the complete useable range. However, as pointed out above, for any given combination of materials and equipment, there is a relatively narrow zone Z, FIG. 1b, of satisfactory operating conditions for consumable electrode welding with short circuiting type metal transfer. Thus, with short circuiting type metal transfer at any given current level satisfactory welding conditions are achieved over a relatively narrow voltage range.

The main consideration in selecting a satisfactory welding condition is to obtain the proper electrode feed speed and power source volt-ampere characteristic. With the proper combination of both wire feed speed and power source volt-ampere characteristic, it is possible to obtain the optimum welding condition. However, in many cases, even though the wire feed speed and power supply output are not exactly matched to produce the optimum welding condition, the system of the present invention will match them sufficiently to produce a condition that still results in satisfactory welds. For this reason, the present invention is not intended as a substitute for the individually adjusted power source and wire feed speed system, but rather supplements such conventional systems in cases where simplicity and ease of operation make it advantageous. Skilled operators may still prefer to adjust welding conditions individually in order to arrive at the very best condition for a particular welding application.

When a variable slope constant potential power source is used there is almost an infinite number of combinations of volt-ampere characteristics which will provide the desired welding voltage and current for a given wire feed rate. On the other hand, power sources having a fixed volt-ampere characteristic slope provide the desired welding voltage and current at only one voltage setting for any given wire feed rate. For this reason, power supplies with a relatively fixed volt-ampere characteristic slope are preferred for use with the present invention, however, variable slope power supplies can be used if the proper volt-ampere curve is selected.

The Linde VI–200 series power supply (manufactured and sold by Union Carbide Corporation) has a fixed volt-ampere characteristic slope. It provides satisfactory welding conditions over the recommended range for short circuiting type metal transfer. Over most of this range the Linde VI–200 power supply response is such as to produce optimum weld results. However, in all cases the VI–200 power source response is such that a satisfactory welding condition is achieved, even though it may not always be the optimum.

When according to the invention the volt-ampere characteristic adjustment mechanism is combined in a single control element with the wire feed speed control mechanism, it is now possible to produce generally satisfactory welding conditions for short circuiting type metal transfer welding. The single adjustment control system of the present invention is adequate for most welding applications using short circuiting type metal transfer.

Figure 2:
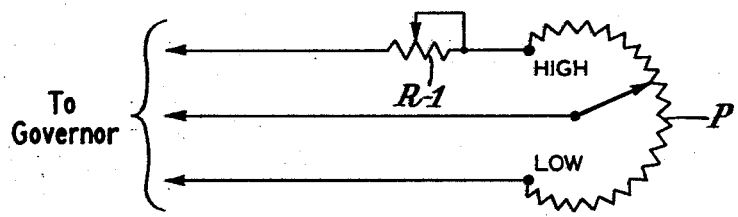
FIG. 2 is a circuit of a wire feed speed control potentiometer provided with an added series resistance.

One of the problems in automatically correlating wire feed speed and power source output lies in the fact that a given wire feed speed will produce different welding currents for different wire sizes; thus, a system designed for a given wire size will work only for that one wire size. It would be desirable to design a system that would work for a number of different wire sizes. In order to accomplish this it is necessary that the wire feed rate adjustment potentiometer of the electrical regulating system produce different wire speeds with different size electrodes so that at a given setting the resulting current will be the same regardless of the wire diameter. According to the invention this is accomplished by adding a variable resistor in series circuit relation with the speed adjusting potentiometer of the electrical regulating system. Such circuit is shown in FIG. 2 in which P is the potentiometer and R–1 is an added variable resistor with a range of 0–30,000 ohms. By properly adjusting resistor R–1 the electrode feed speed can be varied sufficiently so that potentiometer P will produce the same current at the same setting for different wire sizes. With this arrangement, the system can accommodate wire sizes ranging from 0.030 in. diameter to 0.047 in. diameter. With different values for components P and R–1, any practical wire size can be used with the system of the invention.

The potentiometer P of the electrical regulating system for adjusting the wire feed rate normally has a value of 100,000 ohms maximum. The value of the added series resistance R–1 must be limited to less than 100,000 ohms in order to prevent the regulation of the Linde electronic governor wire feed system from becoming unsatisfactory for welding. From a practical consideration, an added series resistance R–1 of approximately 0–30,000 was found to achieve the purpose of the present inventive system. Weld performance tests have shown this value of resistance to provide satisfactory regulation of the wire feed motor and permit the range of wire sizes desired for short circuiting type metal transfer welding.

A proper ratio of coupling is preselected between the power source voltage mechanism and the potentiometer of the electrical regulating system, so that the output of the power source is correlated with the welding current and voltage and wire feed speed, whereby satisfactory welding conditions for short circuiting type metal transfer are produced. Specifically a system using an electronically controlled SEH–2 motor with a 54:1 wire feed gear ratio, or approximately 112:20 gear ratio for driving a ten-turn 100,000 ohm potentiometer from the voltage adjustment screw of a Linde VI–200A power source, will provide automatic adjustment of wire feed speeds for 0.030 in. ferrous wires. The 112:20 gear ratio is preferred for the specific system described. However, for other combinations of equipment the ratio of coupling can be different. Consequently a variable coupling ratio is advantageous for optimum utility of the system according to the invention. The addition of a series 0–30,000 ohm resistance in the wire feed potentiometer circuit provides automatic adjustment of wire feed for other wire sizes.

Figure 3:
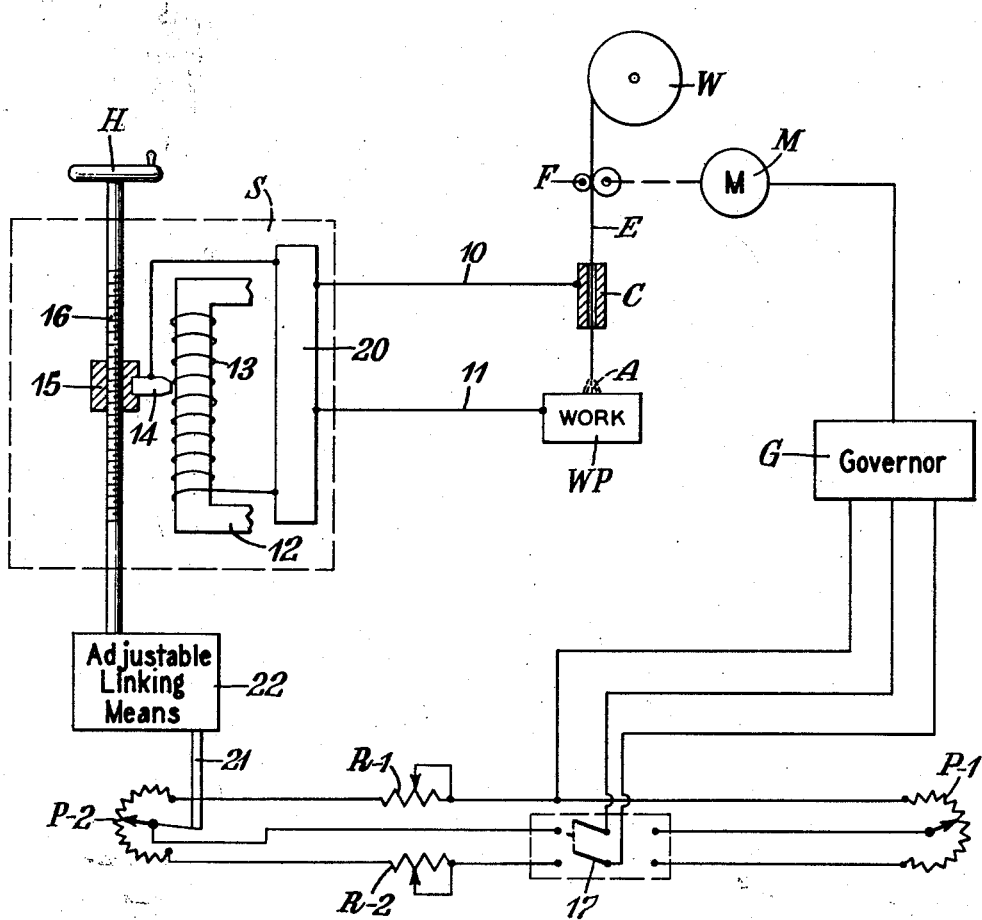
FIG. 3 is a schematic diagram of the preferred embodiment of a single adjustment system for consumable electrode welding with short circuiting type metal transfer.

In the preferred embodiment of the invention welding can be performed in either the automatic mode (with the wire feed regulating system married to the voltage adjustment mechanism of the power supply) or in the normal mode (in which the wire feed speed is adjusted independently from the power supply output in setting welding conditions). This is shown in FIG. 3. The position of double-pole double-throw switch 17 determines which mode of operation will be used. When welding in the normal mode an arc A is struck between wire electrode E and the workpiece WP. The wire is fed to the arc from wire reel W by feed rolls F which are driven by wire feed motor M. The speed of motor M and thus the wire feed rate, is determined by the output of electronic governor G, which in turn is determined by the adjustment of the wire feed potentiometer P–1.

Welding power is delivered to the arc A from power supply S by electrode power cable 10 from the output unit 20 of power supply S to contact tube C, and by ground power cable 11 connected between the workpiece and output unit 20. The welding condition is determined by the wire feed speed and the output voltage of power supply S. The output voltage of power supply S depends on the turns ratio of voltage adjustment transformer 12. By turning handwheel H on power supply S in either direction brush holder 15 and sliding brush 14 are caused to move vertically along the secondary windings 13 of voltage adjustment transformer 12 by means of voltage adjustment screw 16. This in turn changes the voltage at the arc. At the same time the voltage adjustment screw 16 operates through adjustable linkage means 22. For example a 112:20 gear reduction unit having an output shaft 21 was used to change the setting on potentiometer P–2 accordingly; however, since selector switch 17 is in the normal mode position potentiometer P–2 does not alter the welding condition.

To operate the system in the automatic mode the welding operator has only to position selector switch 17 for automatic operation and set the 0–30,000 ohm resistor R–1 to the proper value according to the wire size being used. In so doing, the settings of 100,000 ohm ten-turn potentiometer P–2 and series resistance R–1 control the speed of wire feed motor M through electronic governor G. Welding conditions can now be adjusted merely by turning handwheel H on power supply S. By so doing, the power supply output and the voltage at the arc are changed as described above for the normal mode of operation. The wire feed speed also is changed automatically to correspond to the new arc condition. Voltage adjustment screw 16 acting through the 112:20 gear reduction unit output shaft 21 changes the setting of ten-turn potentiometer P–2 which, with selector switch 17 in the automatic position, adjusts the power output of electronic governor G to change the speed of wire feed motor M to provide the proper electrode feed rate.

In addition to the circuit elements described above, a variable 0–4,000 ohm resistor or potentiometer R–2 was added in the circuit of the ten-turn 100,000 ohm potentiometer. This trim potentiometer R–2 is not a necessary adjunct to the invention, but has been found desirable to produce small adjustments in wire feed speeds at the lower end of the range. Trim potentiometer R–2 will not influence the higher settings of ten-turn potentiometer P–2 to any noticeable degree, but can be used to produce more satisfactory welding conditions at relatively low wire feed rates and relatively low currents.

In the VI–200 power sources, the voltage adjustment handwheel H must be turned several full turns in order to move the sliding brush 14 from one winding on the voltage adjustment transformer 12 to the adjacent winding to provide a voltage increment in the power source output characteristic. On the other hand, a small variation of wire feed speed occurs instantaneously due to the change in the ten-turn potentiometer P–2 position which is directly, mechanically coupled to the handwheel H, resulting in a small change in the welding current. Consequently, as the welding power source voltage control is adjusted from one voltage level to another, the welding condition will move along the static volt-ampere characteristic of the power source between successive power source voltage increments. This is shown, FIG. 4, by the static characteristic curves 25, 26, 27 and 28. Further turning of handwheel H causes an almost instantaneous change in the voltage output of the power supply S which moves the static characteristic curve to a new level as shown by spaces 29, 30 and 31. Such a system provides step-like volt-ampere changes in the welding conditions from one end of the range to the other.

Figure 4:
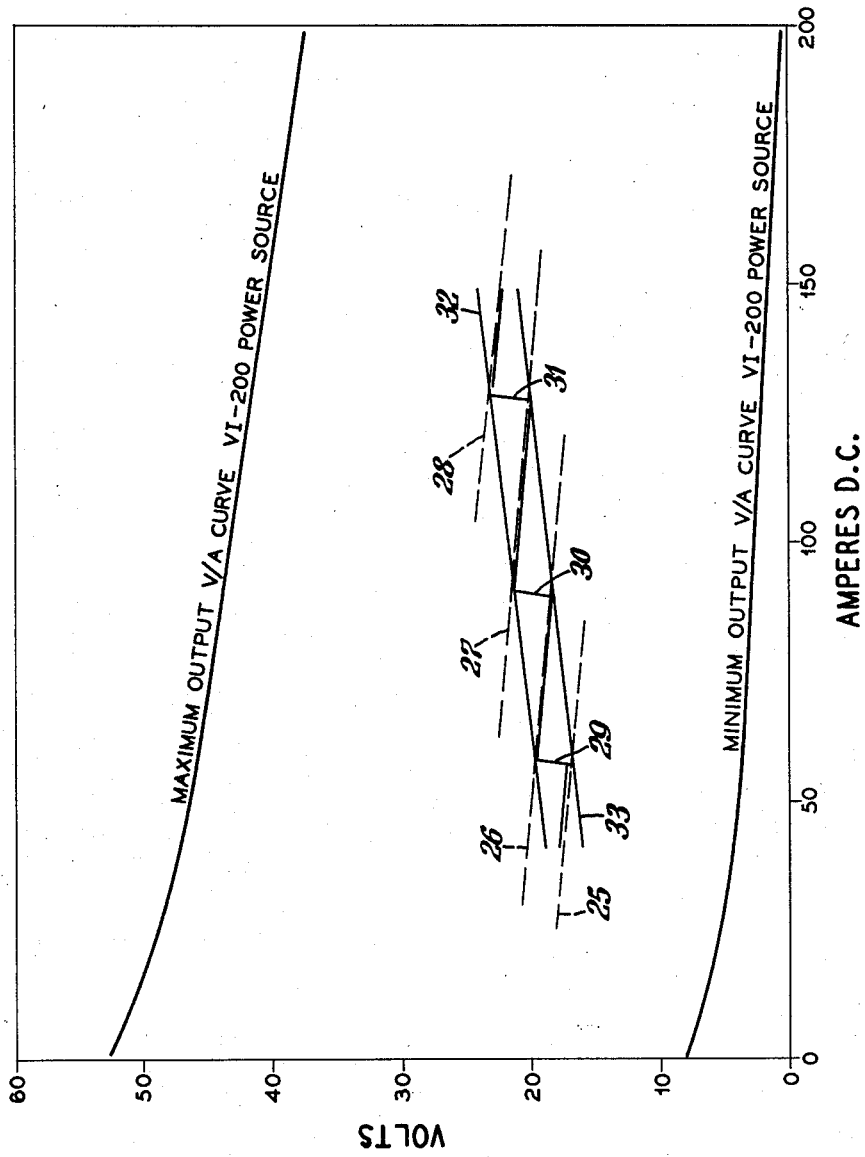
FIG. 4 is a volt-ampere trace showing the typical step-like range of arc operating conditions resulting from the use of the inventive system with 0.030 in. diameter steel wire.

In FIG. 4, curves 32 and 33 represent the recommended range limits of satisfactory conditions for short circuiting type metal transfer welding with 0.030 in. diameter ferrous wires as shown in FIG. 1a. It is to be noted that in all cases the step-like volt-ampere curve produced by the inventive system falls within the limits for satisfactory welding conditions over the entire process range. Welding conditions with the inventive system may not always be the optimum, but they will produce satisfactory results. The curves shown in FIG. 4 can be relatively displaced by adjusting the 0–30,000 ohm series resistor R-1 to a desired region for producing satisfactory welding conditions with short circuiting type metal transfer using wire sizes other than 0.030 in. diameter. The curves shown in FIG. 4 can also be relatively displaced by adjustment of the coupling ratio specified as 112:20 in the specific embodiment discussed herein. In so doing, the step-like volt-ampere changes along the curve are still retained.

Figure 5:
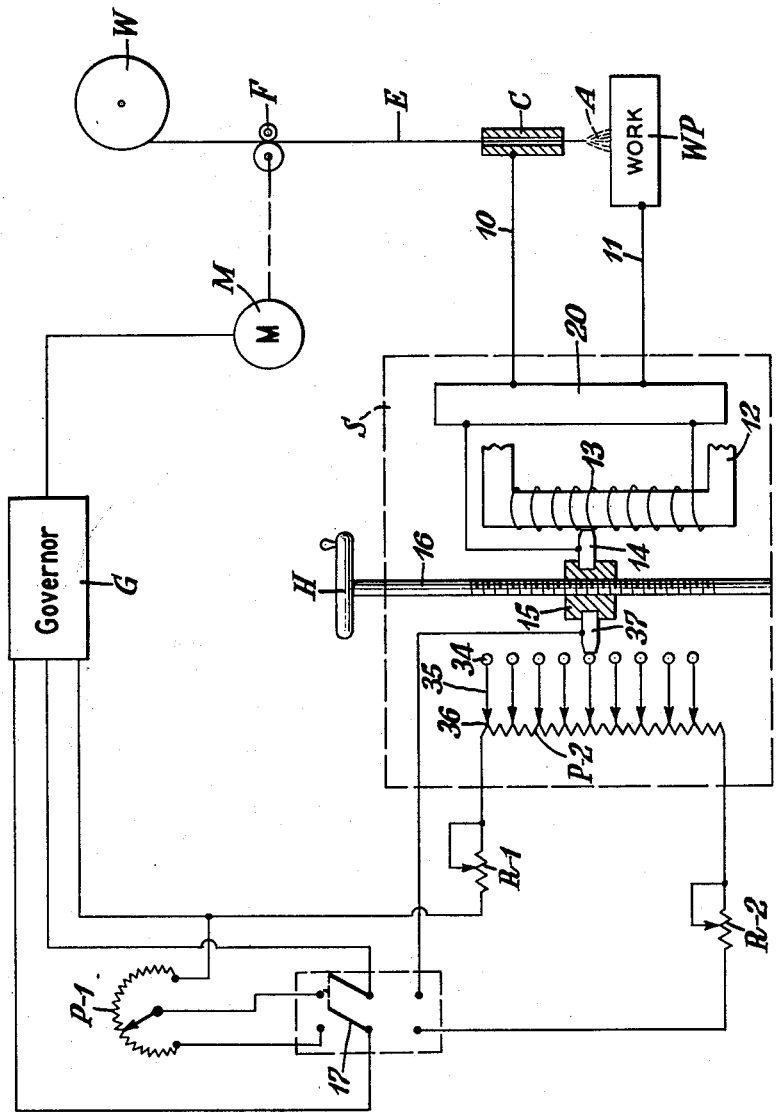
FIG. 5 is a schematic diagram of an alternative embodiment of the invention.

An alternative embodiment of the inventive system is shown in FIG. 5 incorporating a 100,000 ohm potentiometer P-2 in the power sources, provided with a series of contacts 36 attached to the voltage adjustment mechanism of the power supply such that a particular contact is selected for each power source voltage increment. In this embodiment of the invention, the circuitry and the method of operation are similar to that of the preferred system with the exception of the means for changing the setting of the 100,000 ohm potentiometer P-2. In this arrangement the sliding brush holder 15 of power supply S carries, in addition to sliding brush 14 of the voltage adjustment system, a second sliding brush 37 to vary the potentiometer P-2 setting. This brush makes contact with one of a plurality of taps 34, one tap corresponding to each voltage increment of the voltage adjustment transformer 12. Each of these taps 34 is connected to a specific point on potentiometer P-2 by means of a conductor 35 and a contact 36. Each contact 36 is individually movable along potentiometer P-2. With this system it is possible to select a specific potentiometer setting for each voltage output characteristic of the power supply. In this way the wire feed speed can be exactly matched to the power supply setting. The system in every case can thus provide the optimum welding condition for as many combinations of power source adjustments and potentiometer taps as are provided for selecting wire feed speeds.

This alternative embodiment of the present invention is more versatile than the preferred embodiment, FIG. 3. The alternative system shown in FIG. 5 has another advantage over the preferred system in that it can be used with power supplies for spray transfer consumable electrode welding, as well as for short circuiting type metal transfer. When so using such a system for spray transfer welding a selected number of satisfactory arc conditions according to the number of potentiometer taps provided can be produced within the recommended range for consumable electrode welding with spray type transfer as shown in FIG. 1a. Thus, the system in this embodiment can be used with any consumable electrode welding process.

Further alternative embodiments according to the invention include other types of welding power sources such as motor-generator systems and other motor speed control devices such as magnetic amplifier systems.

Actual welding tests consisting of fillet welds on 0.050 in., 0.062 in., and 0.125 in. thick plate with both 0.030 in. diameter and 0.035 in. diameter welding wire were conducted by both experienced and inexperienced welders using the system of the invention. All operators found that acceptable welds could be made on the different thicknesses by adjusting only the single adjustment control. The more experienced operators, however, found that with the system in the normal mode they were able to attain a finer degree of control than when using the system in the automatic mode. The unanimous opinion of those testing the system was that it operated satisfactorily over the intended range and that such a system should prove of particular benefit to inexperienced welders.

What is claimed is:

1. In a consumable electrode work-in-circuit arc welding system, the combination of an arc welding power supply provided with control means comprising means for adjusting the output characteristic thereof, a consumable electrode feed motor provided with control means comprising means for adjusting the electrode feed speed, and means mechanically linking said adjusting means, said linking means comprising means which automatically correlates the selected electrode feed speed with the proper power supply output characteristic in response to adjustment of said linking means to produce satisfactory welding conditions over the entire preselected useful range of the system through the single adjustment of said linking means.

2. In a consumable electrode work-in-circuit arc welding system, the combination of an arc welding power supply provided with control means comprising means for adjusting the output characteristic thereof, a consumable electrode feed motor provided with control means comprising means for adjusting the electrode feed speed, and variable means mechanically linking said adjusting means, said variable linking means comprising means which automatically correlates the selected electrode feed speed with the proper power supply output characteristic in response to adjustment of said linking means, to produce satisfactory welding conditions over the entire preselected useful range of the system through the single adjustment of said linking means.

3. In a consumable electrode-arc welding system provided with means for adjusting the feed rate of the consumable electrode, and means for adjusting the output characteristic of an arc welding power supply in circuit with such electrode and the work being welded, of common means connecting said adjustable means for the simultaneous adjustment thereof, said common means so-correlating both of such adjustments that adjustment of the common means automatically produces a desired welding condition over an entire preselected useful range.

4. In a consumable electrode-arc welding system provided with means for adjusting the feed rate of the consumable electrode, and means for adjusting the output characteristic of an arc welding power supply in circuit with such electrode and the work being welded, of common variable means connecting said adjustable means for the simultaneous adjustment thereof said common variable means so-correlating both of such adjustments that adjustment of the common means automatically produces a desired welding condition over an entire preselected useful range.

5. Work-in-circuit consumable electrode arc welding system comprising a welding power supply provided with voltage adjustment means by which a desired output voltage can be selected, an electrode wire contact-guide electrically connected to one terminal of said welding power supply, means including a wire feed motor for driving wire electrode toward such work through said contact-guide during the welding operation, a governor electrically associated with said motor, said governor comprising a wire feed rate adjustment potentiometer, a variable resistor connected in series circuit relation with said potentiometer whereby the electrode feed speed can be varied sufficiently so that said potentiometer produces substantially the same welding current at a selected setting for different wire sizes, and means mechanically linking the output adjustment of said welding power supply with that of said potentiometer whereby the wire feed speed and power supply output characteristic are so correlated that the selection of a desired welding condition is made with a single adjustment control.

6. Work-in-circuit consumable electrode arc welding system comprising a welding power supply provided with a voltage adjustment transformer by which a desired output voltage can be selected, an electrode wire contact-guide electrically connected to one terminal of said transformer, a ground lead connecting work to be welded to the other terminal of said transformer, means including a wire feed motor for driving an electrode toward such work through said contact-guide during the welding operation, an electronic governor electrically associated with said motor, said governor comprising a wire feed rate adjustment potentiometer, a variable resistor connected in series circuit relation with said potentiometer whereby the electrode feed speed can be varied sufficiently so that said potentiometer produces substantially the same welding current at a selected setting for different wire sizes and means mechanically linking the output adjustment of said transformer with that of said potentiometer whereby the wire feed speed and power supply output characteristic are so correlated that the selection of a desired welding condition is made with a single adjustment control.

References Cited in the file of this patent
UNITED STATES PATENTS
2,441,406    Freeman et al. _____ May 11, 1948